United States Patent
Ancin et al.

(10) Patent No.: US 6,373,590 B1
(45) Date of Patent: Apr. 16, 2002

(54) METHOD AND APPARATUS FOR SLANT ADJUSTMENT AND PHOTO LAYOUT

(75) Inventors: Hakan Ancin; Sean Miceli, both of Sunnyvale; Sean Gugler, Santa Clara; Anoop Bhattacharjya, Sunnyvale, all of CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/244,916

(22) Filed: Feb. 4, 1999

(51) Int. Cl.[7] .................................................. G06F 15/00
(52) U.S. Cl. ........................ 358/1.18; 358/1.9; 358/450; 358/451; 382/289; 382/294
(58) Field of Search .......................... 358/1.1, 1.2, 1.9, 358/1.12, 1.13, 1.16, 1.17, 1.18, 444, 449, 450, 451, 452, 453; 382/268, 284, 289, 290, 291, 293, 294, 295, 296

(56) References Cited

U.S. PATENT DOCUMENTS

| | | | |
|---|---|---|---|
| 5,103,490 A | 4/1992 | McMillin | 358/450 |
| 5,430,550 A | 7/1995 | Hashimoto et al. | 358/497 |
| 5,440,403 A | 8/1995 | Hashimoto et al. | 358/444 |
| 5,465,163 A | 11/1995 | Yoshihara et al. | 358/444 |
| 5,469,274 A | 11/1995 | Iwasaki et al. | 358/450 |
| 5,581,637 A | 12/1996 | Cass et al. | 382/284 |
| 5,649,032 A | 7/1997 | Burt et al. | 382/284 |
| 5,685,002 A | 11/1997 | Sano | 358/450 |
| 6,188,779 B1 * | 2/2001 | Baum | 382/114 |

* cited by examiner

*Primary Examiner*—Mark Wallerson (57) ABSTRACT

An image processor (14) in a photocopier (10) takes composite input image (20a) that includes a plurality of skewed sub-images (22a, 24a, and 26a). It revises the image so as to produce an output composite image (20b) containing aligned sub-images (22b, 24b, and 26b). To identify the input image's sub-images, the image processor (14) identifies connected groups (44, 48 and 54) of pixels that meet certain criteria, and it eliminates from consideration each group (48) whose bounding box (50) is included within the bounding box (46) of another connected group (44). Skew angles for the different sub-images are determined by finding the best-fit lines through the outline pixels of their respective connected groups, and the sub-images are de-skewed by the negatives of those lines' angles.

9 Claims, 10 Drawing Sheets

| | |
|---|---|
| 0 | W |
| | W |
| | W |
| | W |
| 4 | 0 |
| | 1 |
| | 2 |
| | 3 |
| 8 | 4 |

FIG._10A

| | |
|---|---|
| 0 | W |
| | W |
| | W |
| | 0 |
| 4 | 1 |
| | 2 |
| | 3 |
| | 4 |
| 8 | 5 |

METHOD AND APPARATUS FOR SLANT ADJUSTMENT AND PHOTO LAYOUT

BACKGROUND OF THE INVENTION

The present invention is directed to image processing. It finds particular, but not exclusive, application in photocopiers.

Photocopying is an example of a class of image-processing applications in which proper alignment of an input image is necessary or at least desirable. In most cases, alignment of an of an original document on a photocopier bed is easy: it is a relatively simple matter to have the document original abut the edge of the photocopier's scanner bed so as to align its top and bottom edges with ruled indicia provided for that purpose.

But alignment is harder when the user wants to take a composite image of a number of small documents, such as a check and the associated receipt, the front and back of a check, several photographs, etc. In these situations, the user cannot abut all of the documents against the scanner bed's edge, or may not want to, and the scanner-bed indicia are typically not designed to align smaller-sized documents. So the user must align the documents by visual impression only, and the results are only occasionally satisfactory. It would therefore be desirable for the photocopier to include a feature by which it automatically aligns documents to give the resultant composite image a pleasing appearance.

U.S. Pat. Nos. 5,430,550 and 5,440,403 to Hashimoto et al. propose an approach to a similar problem. The problem faced there involves an input image taken from, say, a microfilm transparency containing a number of individual microfilm frames. The transparency may not be aligned properly with the imaging device, and it may be desired to display the individual frames in relative positions different from those that they occupy on the input transparency. The Hashimoto et al. approach to identifying the constituent components and determining their skew angle vis-à-vis the input scan orientation is to find the first and second locations in each of a plurality of scan lines where transitions occur between bright, indicating a blank transparency region with no frame present, to darker, indicating the presence of a frame. These two locations will indicate the places where the two frames begin. The frames' skew angle can be determined by the differences between where these transitions occur in different scans.

The approach described in the Hashimoto et al. patents has the virtue of simplicity. Whatever its applicability to microfilm transparencies may be, however, it is not well suited to the problem described above, where the types of input images vary more in size and position, and contrast is not as great between document and no-document locations.

SUMMARY OF THE INVENTION

We have arrived at an approach that yields good results in the more-difficult applications described above. In accordance with our approach, constituent input sub-images of the input composite image are independently de-skewed, by angles that are not the same in general, to produce corresponding constituent sub-images of the output image. The sub-images are identified by using what we call "components" of a "preview" version of the image. The preview image can be the image itself but is more commonly a lower-resolution version of that image. A component is a "connected group" of the preview image's pixels that meet certain pixel-qualifying criteria based on the values of those pixels and/or of pixels in their neighborhoods. A pixel-qualifying criterion that we use in one embodiment, for instance, is that the image's gradient magnitude at the pixel's location exceeds a predetermined threshold after that image has been subjected to unsharp masking.

As used here, a connected group of qualifying pixels is one in which each group member is "connected" to all others. A first qualifying pixel in a group is connected to a second pixel in the group if (1) the first and second qualifying pixels meet a predetermined proximity criterion or (2) the first pixel meets the predetermined proximity criterion with a qualifying pixel that is connected to the second qualifying pixel. For present purposes, a proximity criterion is one met by some of the image's pixel pairs and not by others and for which there exist maximum and minimum distances such that the proximity criterion is not met by any pixel pair whose pixels' positions differ by more than the maximum distance but is met by each pixel pair whose pixels' positions differ by less than the minimum distance. The proximity criterion employed here is that the two pixels must be contiguous, but other proximity criteria can be used instead.

Components that meet certain component-qualifying criteria are assigned respective de-skewing angles and employed to define the input sub-images that are separately de-skewed. More specifically, a predetermined bounding rule is used to associate with each qualifying component an input-composite-image bounding region that includes all of the component's pixels. This bounding region contains the part of the input composite image that is de-skewed in accordance with that component's de-skewing angle to produce the output composite image's constituent sub-images.

In accordance with the present invention, one of the component-qualifying criteria is that a second bounding region of the composite input image determined in accordance with a second bounding rule from a given component not be contained completely within a third bounding region, determined in accordance with a third bounding rule from any other component. In the embodiment to be described below, the second and third bounding rules are the same, so the bounding regions determined in accordance with them from a given component are, too.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
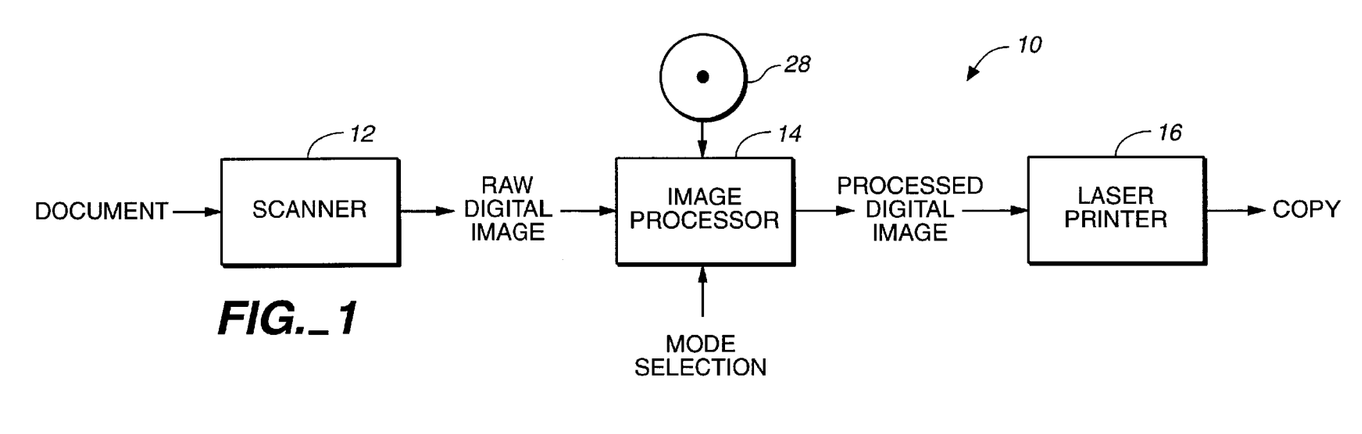
FIG. 1 is a block diagram of a photocopier in which the present invention's teachings can be employed.

The present invention can be embodied in a wide variety of photocopiers, but FIG. 1 depicts a typical photocopier organization. The photocopier 10 includes a scanner 12 that optically scans one or more documents placed on a scanner bed and generates electrical scanner signals that represent a digital image of the bed's contents. An image processor 14 receives the resultant raw digital image and performs a number of image-processing operations that result in generation of electrical signals that represent a processed digital image. A rendering device such as a laser printer 16 responds to the processed digital image by making a hard copy.

Figure 2A:
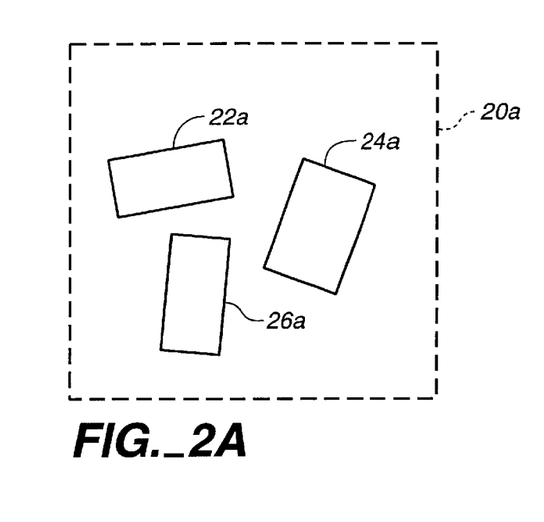
FIGS. 2A and 2B are diagrams depicting an original image and the de-skewed image that results from application of the present invention's teachings.

If the user has placed more than one, typically small document on the scanner at one time, the resultant image can be thought of as a composite, which includes a plurality of constituent images. The constituent images may represent, for instance, a check and a corresponding receipt, the front and back of a canceled check, multiple photographs, etc. In such cases, it usually occurs that the user has difficulty in orienting the constituent documents properly, and the resultant copy has a disagreeably haphazard appearance. That is, FIG. 2A's composite image 20a, which is rectangular in shape, may include constituent rectangular shapes 22a, 24a, and 26a whose sides are not parallel to those of the composite image.

Figure 2B:
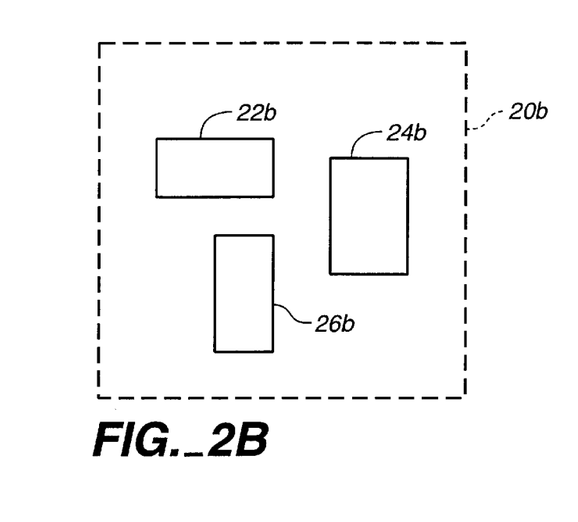

In accordance with the present invention the user may select a re-orienting mode to avoid this. In this mode, the image processor includes among its processing steps a re-orienting operation that results in an output of the type that FIG. 2B depicts. The sides of the revised composite image's constituents 22b, 24b, and 26b are parallel to corresponding sides of the composite image 20b. In performing this re-orienting operation, the image processor 14 will typically follow a set of program instructions stored on a machine-readable medium such as FIG. 1's disc 28.

Figure 3:
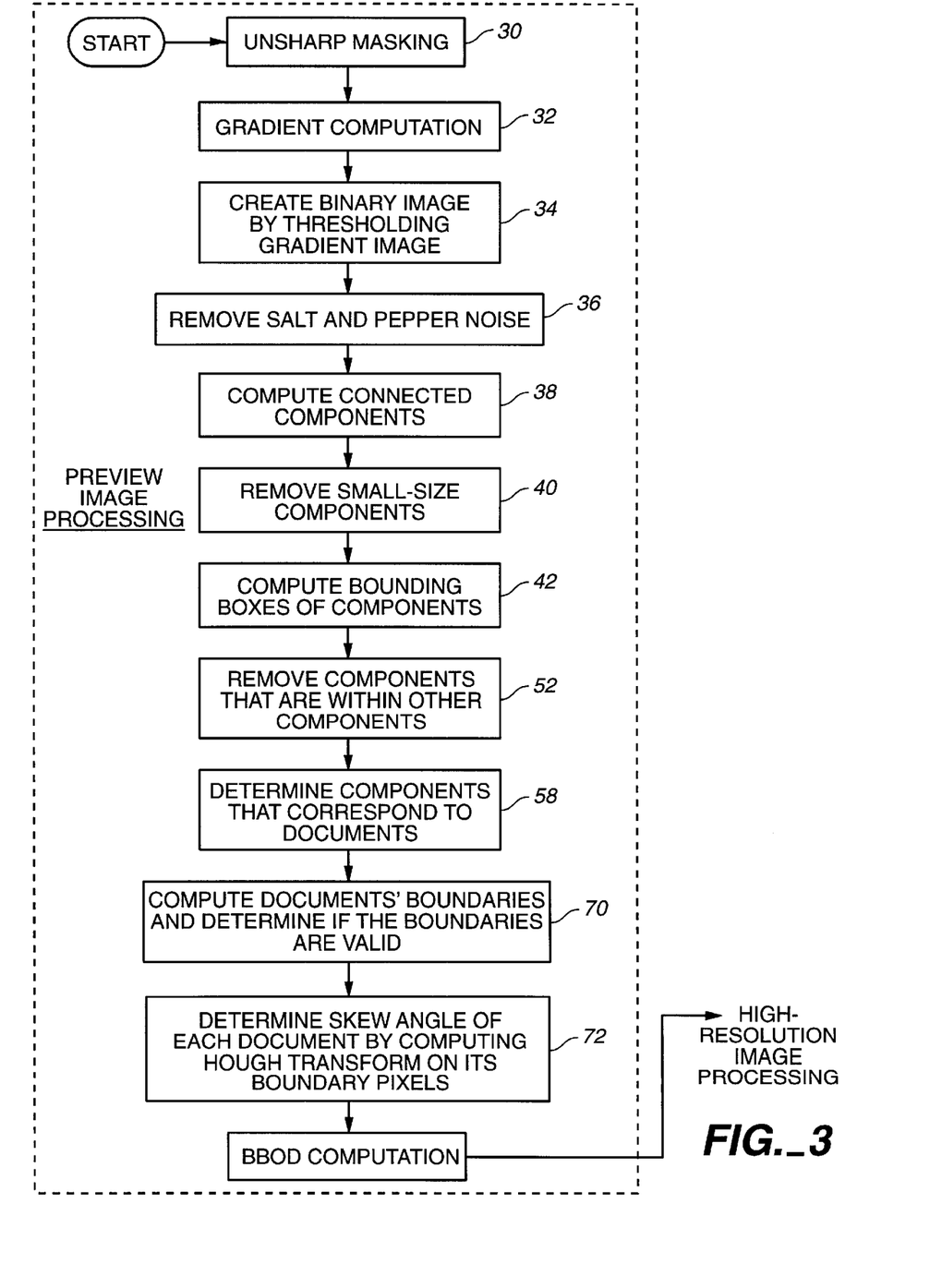
FIG. 3 is a block diagram that depicts the skew-angle determination that the illustrated embodiment employs.

Although the image transformation required to re-orient a given rectangular constituent by a specified de-skewing angle is relatively straightforward, that transformation can be performed only after the constituent's boundaries and skew angle have been determined. FIG. 3 depicts the steps that the illustrated embodiment employs to identify these constituents, which are assumed to be rectangular, and determine their skew angles with respect to the composite-image outline.

We assume below that the scanner 12's output represents a color image, although the same operations can be performed in a simplified manner to process solely gray-scale images. That is, for each of a plurality of pixels into which the image is divided, the raw digital image includes a digital value for each of a plurality of color components. Those components are typically red, green, and blue, in which case maximum red in an eight-bit-per-component system is (255, 0, 0), maximum white is (255, 255, 255), and maximum black is (0, 0, 0).

The scanner 12 will typically be a high-resolution device, affording a spatial resolution of, say, 240 or 600 dots per inch ("dpi"). Not all of this resolution is required for the operations that FIG. 3 depicts, though, and operating with such a high-resolution image therefore makes the operation unnecessarily slow. So we will assume that the photocopier in some fashion provides the FIG. 3 operation with a lower-resolution, "preview" version of the image. The scanner itself may be capable of doing this optically, or the lower-resolution image can be generated from the higher-resolution image by low-pass filtering and sub-sampling. In either case, we will assume for the sake of example that FIG. 3's operations are performed on, say, a 120-dpi-version of the image. After the constituent-document outlines and their skew angles have been determined in accordance with the FIG. 3 process, the re-orienting operation is performed on the high-resolution image.

The first step in FIG. 3's processing is its unsharp-masking step 30. This operation, which can roughly be characterized as subtracting from an image a low-pass-filtered version of itself, tends to sharpen the image. There are many ways in which an unsharp-masking operation can be performed on a color image, but a typical approach starts with a brightness value. The brightness value can be computed as, say, $$I_{i,j} = \frac{r_{i,j} + g_{i,j} + b_{i,j}}{3}, \tag{1}$$

where $I_{i,j}$ is the gray-scale intensity, or brightness, at location (i,j). Although equation (1) weights all three color components equally, it may be preferable to weight them differently in accordance with, say, the sensitivities of charge-coupled devices in the respective scanner color channels.

The particular unsharp-masking approach that the illustrated embodiment employs emphasizes local brightness variations by replacing the red-, green-, and blue-channel values $r_{i,j}, g_{i,j}, b_{i,j}$ with revised values $r'_{i,j}$, $g'_{i,j}$, and $b'_{i,j}$ in accordance with the following equations:

$$r'_{i,j}=r_{i,j}+I'_{i,j}-I_{i,j} g'_{i,j}=g_{i,j}+I'_{i,j}-I_{i,j} b'_{i,j}=b_{i,j}+I'_{i,j}-I_{i,j} \tag{2}$$

where $I'_{i,j}$ is a sharpened gray-scale value.

$I'_{i,j}$ is computed as the following weighted difference between a pixel's gray-level brightness and an average $I_{i,j}''$ of that brightness in a neighborhood around the pixel:

$$I'_{i,j}=\alpha I_{i,j}-\beta I''_{i,j}, \tag{3}$$

where α and β are weighting factors. We have employed the values α=4 and β=3 and, in a system in which the pixel-value components are stored as eight-bit unsigned integers, clipped the resultant $I'_{i,j}$ values to the range of 0 to 255.

The average values $I_{i,j}''$ can be computed as, say, elements of a low-pass-filtered gray-scale image I″ obtained by convolving the intensity with a low-pass kernel H:

$$I''=I*H. \tag{4}$$

For images whose resolutions are 240 dots per inch ("dpi"), we have used the following low-pass kernel:

$$H = \frac{1}{16}\begin{bmatrix} 1 & 2 & 1 \\ 2 & 4 & 2 \\ 1 & 2 & 1 \end{bmatrix}, \quad (5)$$

whereas we have used the following kernel for 600-dpi images:

$$H = \frac{1}{100}\begin{bmatrix} 1 & 2 & 4 & 2 & 1 \\ 2 & 4 & 8 & 4 & 2 \\ 4 & 8 & 16 & 8 & 4 \\ 2 & 4 & 8 & 4 & 2 \\ 1 & 2 & 4 & 2 & 1 \end{bmatrix}. \quad (6)$$

Having sharpened the image, the image processor finds locations where there are large brightness changes, as is typically the case at the edge of one of the constituent document images. In this step the image processor computes a gradient magnitude $G_{i,j}$, block 32 indicates, in accordance with the following equation:

$$G_{i,j} = \frac{1}{3}(|\nabla r_{i,j}| + |\nabla g_{i,j}| + |\nabla b_{i,j}|), \quad (7)$$

where $$|\nabla c_{i,j}| = \sqrt{\nabla_x^2 c_{i,j} + \nabla_y^2 c_{i,j}}, \quad (8)$$

and $$\begin{aligned} \nabla_x r' &= r' * S_x & \nabla_y r' &= r' * S_y \\ \nabla_x g' &= g' * S_x & \nabla_y g' &= g' * S_y \\ \nabla_x b' &= b' * S_x & \nabla_y b' &= b' * S_y \end{aligned} \quad (9)$$

Here $c_{i,j}$ is $r_{i,j}$, $g_{i,j}$, or $b_{i,j}$, and $S_x$ and $S_y$ are horizontal and vertical Sobel kernels with which we convolve the individual color image components. For the 240-dpi case, we have used lie following Sobel kernel:

$$S_x = \frac{1}{4}\begin{bmatrix} 1 & 0 & -1 \\ 2 & 0 & -2 \\ 1 & 0 & -1 \end{bmatrix} \quad (10)$$

$$S_y = \frac{1}{4}\begin{bmatrix} 1 & 2 & 1 \\ 0 & 0 & 0 \\ -1 & -2 & -1 \end{bmatrix}.$$

For the 600-dpi case, the Sobel kernels we have used are:

$$S_x = \frac{1}{16}\begin{bmatrix} -1 & -1 & 0 & 1 & 1 \\ -1 & -2 & 0 & 2 & 1 \\ -2 & -4 & 0 & 4 & 2 \\ -1 & -2 & 0 & 2 & 1 \\ -1 & -1 & 0 & 1 & 1 \end{bmatrix} \quad (11)$$

$$S_y = \frac{1}{16}\begin{bmatrix} 1 & 1 & 2 & 1 & 1 \\ 1 & 2 & 4 & 2 & 1 \\ 0 & 0 & 0 & 0 & 0 \\ -1 & -2 & -4 & -2 & -1 \\ -1 & -1 & -2 & -1 & -1 \end{bmatrix}.$$

We then divide the image's pixels into high-gradient-magnitude pixels and low-gradient-magnitude pixels to produce a binary image, i.e., one represented by only a single bit for each pixel. As FIG. 3's block 34 indicates, we do this by thresholding the gradient magnitudes of the equation (7). The threshold employed may be fixed, but it can also be the result of taking a histogram of the gradient magnitudes and choosing, say, its 95th-percentile value.

We can think of steps 30, 32, and 34 as imposing a pixel-qualification criterion, eliminating most of the pixels from consideration and leaving only those with the binary value that identifies them as occupying high-gradient regions. Large connected groups of these form the outlines of constituent images, but there typically are many other pixels remaining, and the processor must distinguish between these and those that make up actual constituent-image boundaries. One basis for eliminating pixels from consideration is that they do not form large groups of connected pixels.

Specifically, we eliminate from consideration all pixels that, in a 120-dpi version of the image, are not parts of groups that consist of at least 1,000 pixels. In practice, we perform this operation in two parts, because it turns out that doing so reduces computation. In the first step, represented by block 36, we identify and remove from consideration isolated pixels and pixels that are in two- or three-pixel groups only. These typically represent "salt and pepper" noise and are not part of a constituent-image outline.

FIG. 3's blocks 38 and 40 represent the next step. Block 38 represents determining the sizes of the remaining connected groups, while block 40 represents eliminating of groups that do not exceed 1,000 pixels each. The resultant "components"—i.e., sets of connected pixels—are then numbered and each surviving pixel is labeled with the number of the component to which it belongs.

Figure 4:
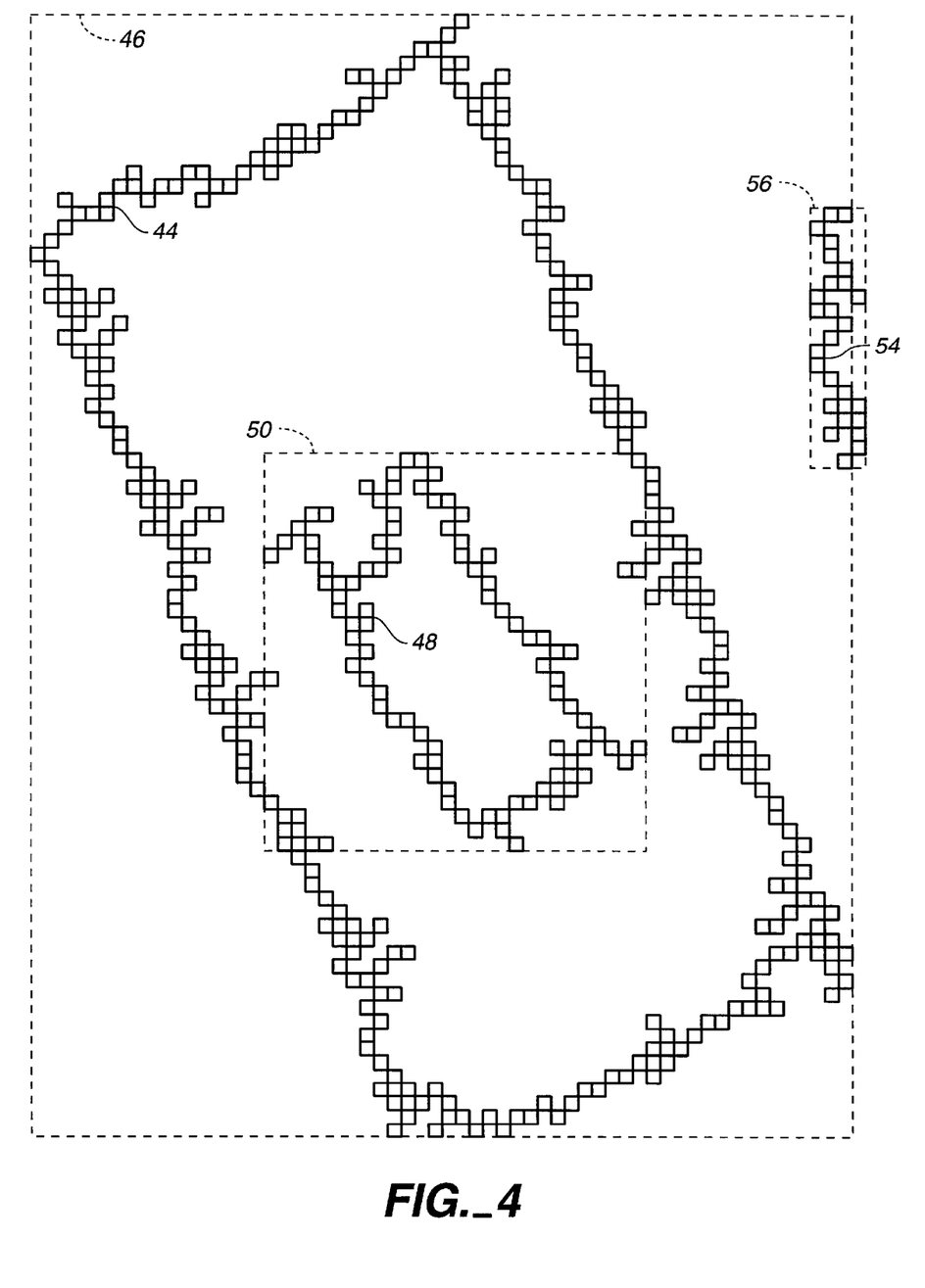
FIG. 4 is a diagram depicting bounding boxes for different connected-pixel components.

FIG. 3's block 42 represents the step of determining each remaining component's "bounding box" i.e., the smallest rectangle that includes all of that component's pixels and has pixel-row and pixel-column boundaries. In FIG. 4, for instance, component 44's bounding box is rectangle 46. (For the sake of illustration, component has a greater skew angle than would ordinarily be encountered, and it consists of fewer than the 1000-pixel minimum.). One of the bounding box's purposes is to provide an easily computed estimate of whether any component is enclosed by another component. Such enclosed components can be eliminated from consideration as possible constituent-document boundaries. For example, component 48 can be eliminated from consideration because the image region defined by its bounding box 50 falls totally within the region defined by component 44's bounding box 46. FIG. 3's block 52 represents the step of removing such enclosed components.

We employ this particular non-inclusion criterion in the illustrated embodiment because it is relatively convenient, but other types of non-inclusion criteria can be used instead. For example, the image regions associated with the potentially enclosing and enclosed components do not have to be bounding boxes. Indeed, different, "outer" and "inner" region-defining processes can be used respectively to define the regions associated with the potentially enclosing and enclosed components, and the criterion would be that the inner region defined for a qualifying component cannot be enclosed by the outer region defined for any other component.

Components that meet the non-inclusion criterion may be subjected to other component-qualification criteria. For example, some components are so shaped that they are unlikely to have arisen from constituent documents' outlines. In FIG. 4, for instance, component 54's bounding box 56 has an aspect ratio that is considerably greater than that which would be expected from any constituent document, so the image processor eliminates that component from consideration, also. FIG. 3's block 58 represents this step.

After the image processor has thus eliminated from consideration those components that are unlikely to represent constituent-document boundaries, it turns to associating with each qualifying component a de-skewing angle and a region of the input image to which that de-skewing angle is to be applied. In the illustrated embodiment, the procedure for determining a skew region from a component includes refining the image processor's estimate of the source document's boundary. As was mentioned above, each of the three components 44, 48, and 54 depicted in FIG. 4 has far fewer pixels than the 1,000-pixel minimum. A 1000-pixel component's sides are usually much thicker than that of FIG. 4's components. To refine its estimate of the actual border location, the image processor takes advantage of this fact by using a morphological-opening operation to smooth out the component boundary and thereby eliminate further noise-generated pixels.

Figure 5:
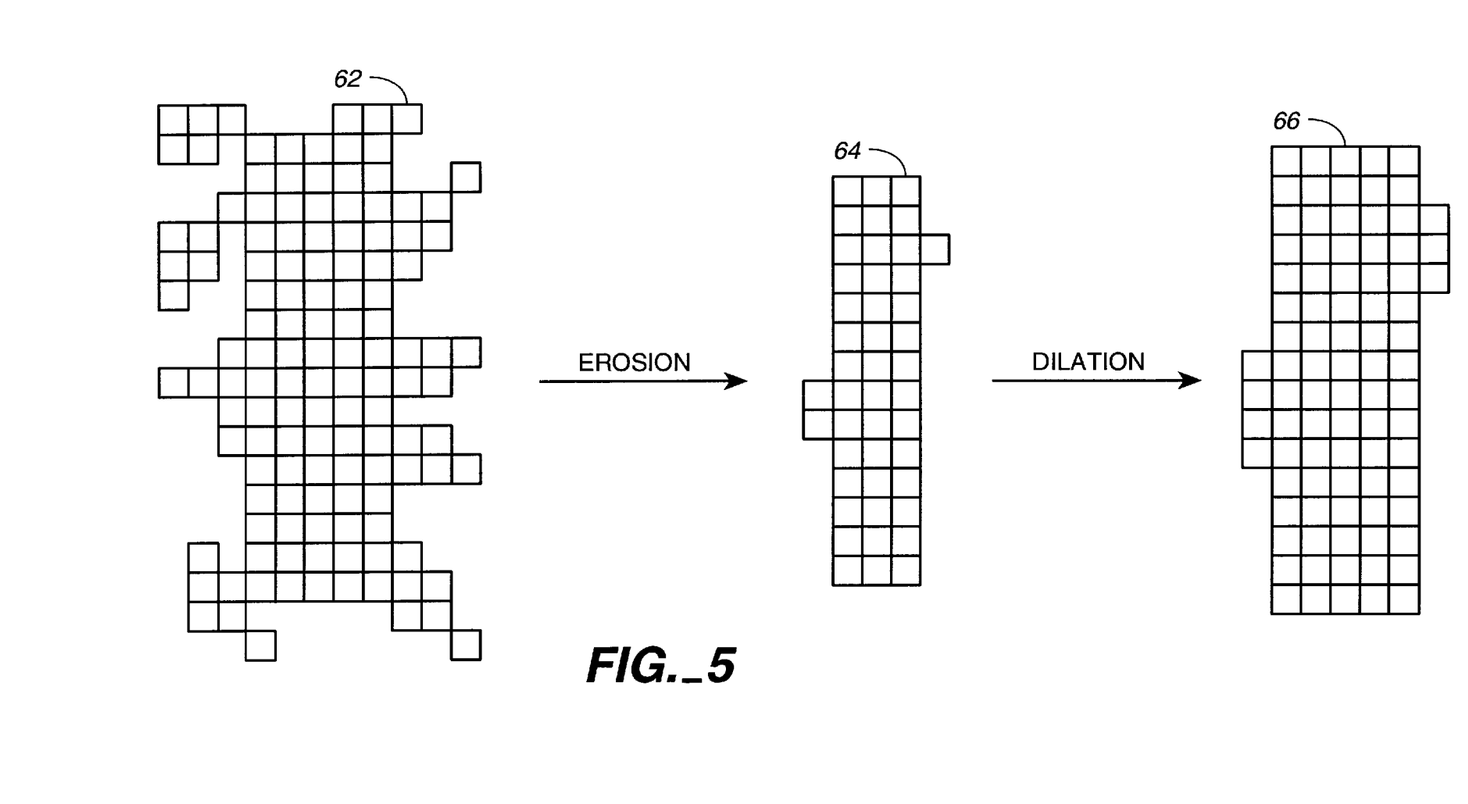
FIG. 5 is a diagram that illustrates the morphological-opening operation employed in making that skew-angel determination.

FIG. 5 depicts such an operation. Its pixel set 62 represents one fragment of a component that has survived the previous elimination operations. This pixel set has jagged edges, which would typically represent noise. The morphological-opening operation eliminates such noise and thereby refines the estimate of the constituent document's boundary location. Such operations can be performed in many ways, but the one that is simplest and illustrates the operation most clearly involves a single "erosion" operation followed by a single "dilation" operation.

In the simplest type of erosion operation, any surviving pixel is eliminated if not all of the eight pixels contiguous to it also survived the previous operations. As FIG. 5's resultant pixel set 64 shows, the erosion operation tends to compact the component, eliminating most jagged protrusions. But that operation also shrinks the pixel set, thereby making the component appear smaller than it is in the initial data. To remedy this problem, the image processor performs a "dilation" operation: if a pixel did not previously belong to the component but was contiguous to one that did, it is added to the component.

The result is FIG. 5's pixel set 66. As the FIG. 5 progression shows, this morphological-opening operation smoothes the component's outline. This tends to eliminate noise.

Various ways of performing morphological opening operations are well known in the art, and the particular choice among them is not critical. Indeed, we employ a method that is computationally efficient but only approximates such an operation. We inspect each scan row within a component's bounding box. If it has no pixel run of at least ten pixels, we eliminate every pixel in the row that is not part of a run of at least five pixels. If the row does have a pixel run that exceeds ten pixels in length, then we make no change to the row. We then perform a similar operation on each column within the component's bounding box.

Once the morphological opening operation has been completed, the image processor refines the bounding-box determinations by re-computing the bounding boxes from the noise-suppressed components.

With the morphological-opening operation completed, the image processor has finished its assignment of pixels to components. That is, every pixel in the image has been assigned a binary value that indicates whether it belongs to a component—i.e., whether it has survived the culling processes thus described above—and those that do belong to components have been labeled with the identities of the components to which they belong.

Figure 6:
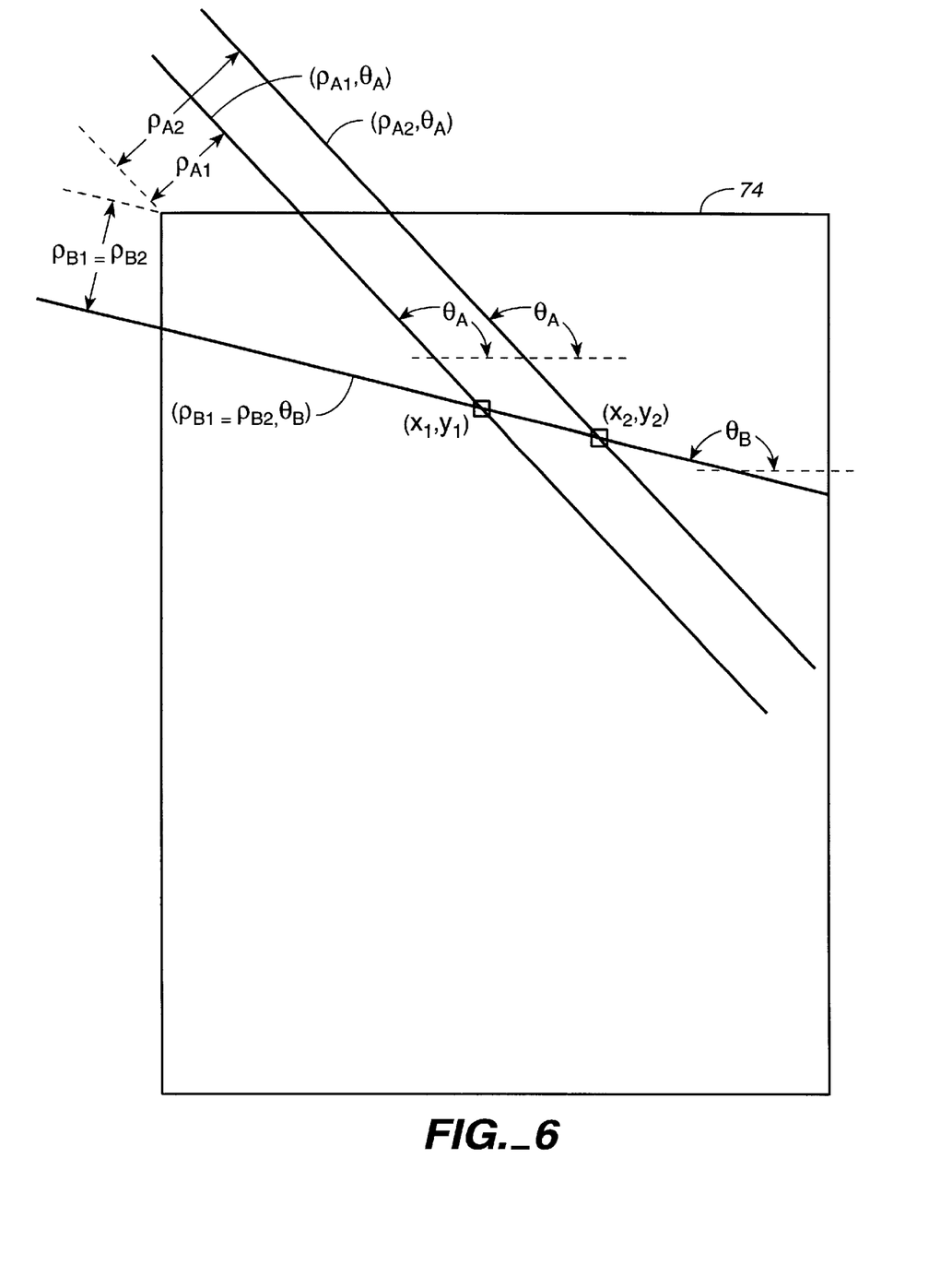
FIG. 6 is a diagram that depicts various geometrical quantities employed in making the skew-angle determination.

The image processor can then begin determining each surviving component's skew angle. It bases that determination on each component's boundary pixels. To identify boundary pixels, the image processor scans the image rightward from the left of the component's bounding box to find the first pixel in each scan line and leftward from the right of the bounding box to find the last pixel in each scan line. It similarly scans from the top and bottom of the bounding box. The pixels thus identified are considered the respective components' boundary pixels. FIG. 3's block 70 represents the boundary-determination operation. Occasionally, this operation results in a relatively large number of boundary-identified pixels that are unconnected. The boundary thus determined is considered unreliable in that case, and some remedial operation occurs. For instance, the unit may repeat the optical scanning and start the whole operation over again, or it may repeat the processing with a different threshold. For each component, the pixel locations thus determined are the input to the operation for determining the component's skew angle. The skew-angle determination, which FIG. 3's block 72 represents, employs a two-dimensional-histogram operation. FIG. 6 illustrates the principle employed to populate the histogram. The upper left corner of an image 74 is conventionally considered the origin of a coordinate system that specifies pixel locations.

Now consider two pixels, respectively located at $(x_1, y_1)$ and $(x_2, y_2)$, and assume that these pixels have been identified as a given component's boundary pixels. If these were the only two pixels used to determine one of the four boundary lines, identifying that line would be a simple algebraic exercise. But identifying the component boundary is not that simple; it is complicated by two considerations. One is that the boundary is typically made up of four line segments, not one, so two arbitrarily chosen boundary pixels do not necessarily belong to the same boundary line segment. The other is that the image processor must base its determination on a very large number of such pixel locations, not on only two.

The way in which the image processor deals with this involves computing, for each boundary pixel, the lines that pass at each of a plurality of angles through that pixel. More specifically, each line can be uniquely represented by an ordered pair $(\rho, \theta)$, where $\theta$ is the angle that the line makes with the x axis, and $\rho$ is the directed perpendicular distance from that line to the origin, i.e., to the image's upper left corner. The two-dimensional histogram has bins for pairs of $(\rho, \theta)$ sub-ranges, where the $\rho$ sub-ranges may, say, span the range from the image length to the negative of the image length and the $\theta$ sub-range may, say, span the range from, say, $-10°$ to $+10°$. (Obviously, a more-comprehensive system could have $\theta$ extend from $-90°$ to $+90°$, but such a range is ordinarily unnecessary; users typically orient their documents with only small skew angles.)

Consider the result for the two boundary pixels that FIG. 6 illustrates. The line that passes through pixel $(x_1, y_1)$ at angle $\theta_A$ has a perpendicular distance $\rho_{A1}$ to the origin, while the line through $(x_2, y_2)$ at angle $\theta_A$ has a greater distance, $\rho_{A2}$. Computation of the lines at angle $\theta_A$ through the two boundary pixels results in incrementing the counts in different histogram bins: the bin containing $(\rho_{A1}, \theta_A)$ is incremented as a result of computing of the $\theta_A$ line through the first boundary pixel, whereas computation of the same-angled line through the second boundary pixel results in incrementing the count in the bin that contains $(\rho_{A2}, \theta_A)$. And the result is typical: computation of same-angled lines through different boundary points ordinarily results in incrementing different bins' contents, because the resultant perpendicular distances differ.

The exception to this rule occurs when the angle is the component's skew angle, because many boundary points will tend to occupy the same, skew-angled line. FIG. 6 illustrates this with line $(\rho_{B1}=\rho_{B2}, \theta_B)$. If $\theta_B$ is the skew angle, the contents of the bin containing that line will be incremented many times as often as those of most other bins. For a generally rectangular component, the histogram will tend to have two maxima, corresponding to the constituent image's top and bottom boundaries. (If the system computes lines for a wider range of angles, there may also be maxima for the left and right boundaries.) Both will occur at the skew angle. In principle, the skew angle is simply determined by noting which-angled bins contain the largest maxima. In practice, the determination is slightly more complicated, since the actual skew angle typically falls between two of the angles for which lines are computed, so the skew-angle determination may be based on adjacent-bin pairs.

Figure 7:
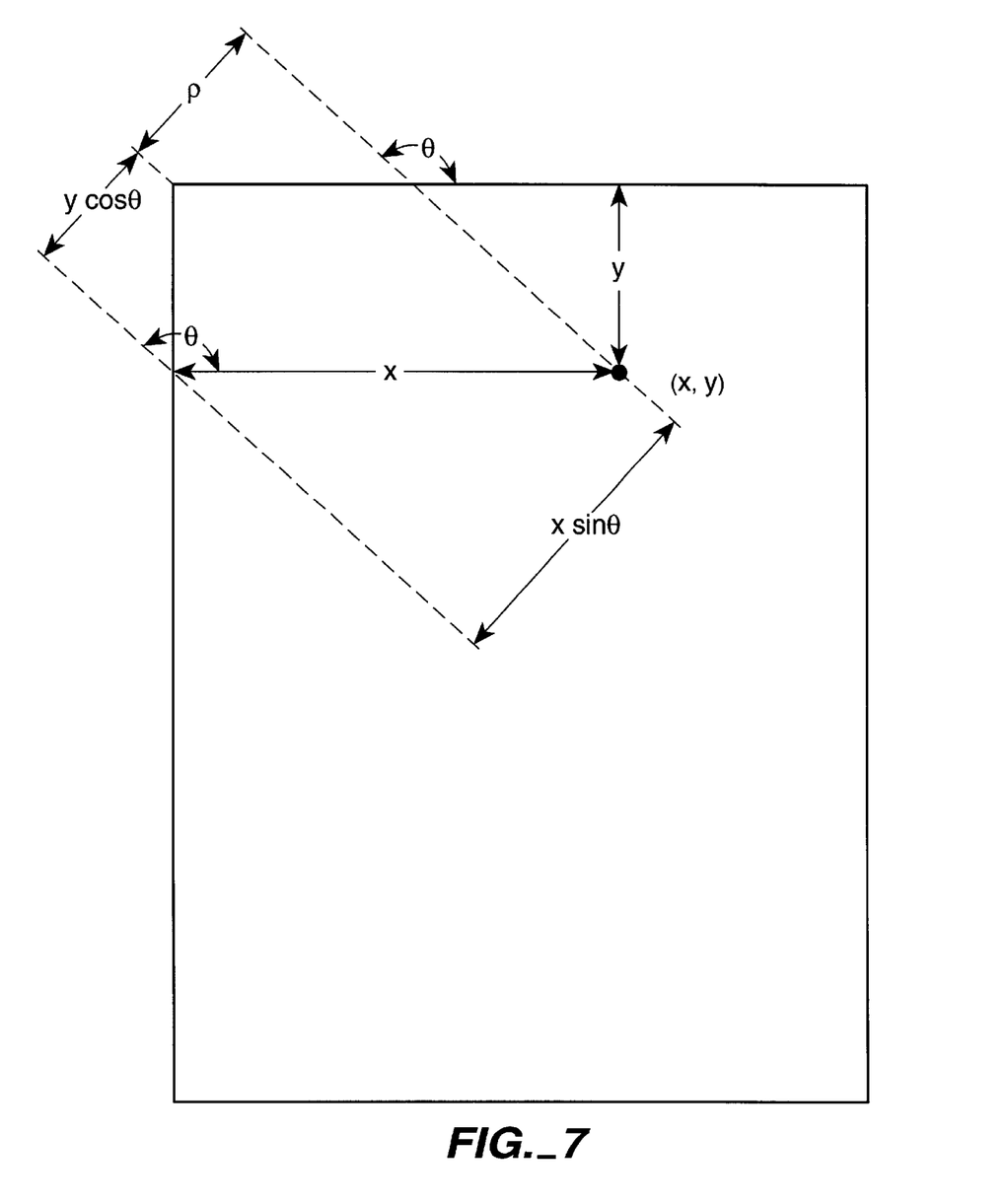
FIG. 7 is a diagram that depicts further geometric quantities used for the same purpose.

The actual perpendicular-distance computation is straightforward, as FIG. 7 illustrates. If, as is conventional, the origin is taken as being the image's upper left corner, the x value increases from left to right, they value increases in the downward direction, and $\theta$ is the clockwise angle from the x axis, then the value of $\rho$ for any $(x, y)$ is given by the following equation:

$$\rho = x \sin\theta + y \cos\theta. \quad (12)$$

In the particular case illustrated in FIG. 7, $y \cos\theta$ has a negative value, so the magnitude of the perpendicular distance $\rho$ equals the distance between magnitude of $y \cos\theta$ and the magnitude of $x \sin\theta$.

Once the skew angle has been determined by processing the low-resolution image, that angle can be used to de-skew the high-resolution image. A memory-efficient way to do this is simply to rotate the contents of each component's bounding box by a de-skewing angle equal to the negative of the skew angle determined for that component. That makes it unnecessary to retain a component-indicating label for each pixel. The rotation's equation is as follows:

$$\begin{bmatrix} x' \\ y' \\ 1 \end{bmatrix} = \begin{bmatrix} 1 & 0 & x_C \\ 0 & 1 & y_C \\ 0 & 0 & 1 \end{bmatrix} \begin{bmatrix} \cos\theta & -\sin\theta & 0 \\ \sin\theta & \cos\theta & 0 \\ 0 & 0 & 1 \end{bmatrix} \begin{bmatrix} 1 & 0 & -x_C \\ 0 & 1 & -y_C \\ 0 & 0 & 1 \end{bmatrix} \begin{bmatrix} x \\ y \\ 1 \end{bmatrix} \quad (13)$$

where $(x, y)$ is the location of a (high-resolution) input-image pixel, $(x', y')$ is the output-image location that receives the $(x, y)$ input pixel's value, $\theta$ is the de-skewing angle, and $(x_C, y_C)$ is the center of the bounding box. Then each (high-resolution) pixel within the de-skewed bounding box is assigned a value by reversing the equation (13) operation to find the input-image location that will translate to that output location.

But a potential problem must be dealt with before the image processor uses these results to assign output pixel values. The problem is that two components' bounding boxes may overlap. The skew angles for the two components will not be the same in general, nor will the centers of their bounding boxes. So one or the other (or both) of the documents may be distorted if the overlapped region is de-skewed. One way to deal with this problem is simply to alert the user to the problem so that he can rearrange the documents before the copy is made. But that is sometimes unnecessary even when bounding boxes overlap.

Figure 8A:
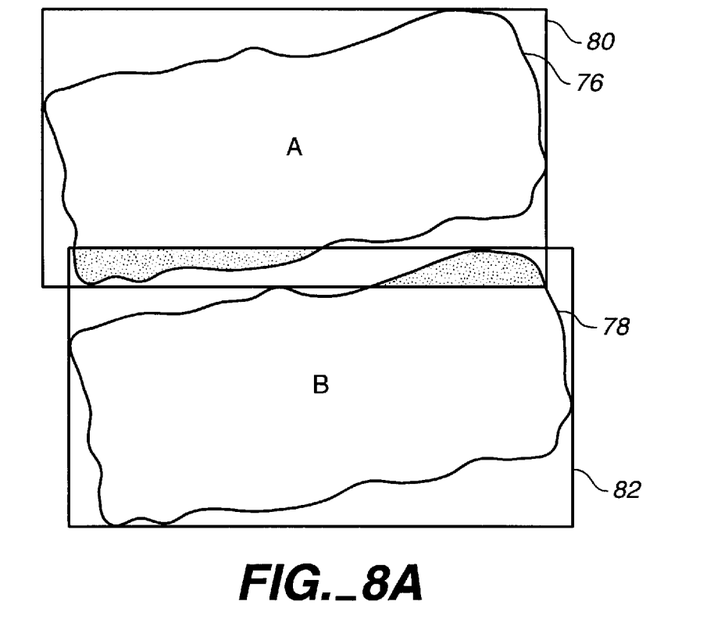
FIGS. 8A and 8B are diagrams of two components' bounding boxes before and after de-skewing.
Figure 8B:
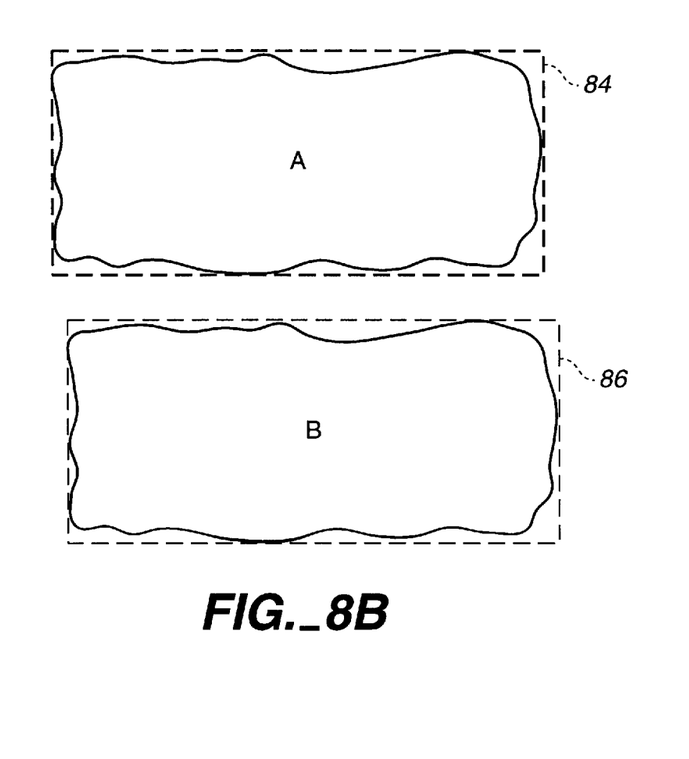

This can be appreciated by referring to FIGS. 8A and 8B. FIG. 8A shows two components 76 and 78 whose bounding boxes 80 and 82 overlap. One way to determine whether the machine can avoid having the user reorient the documents is first to de-skew the (low-resolution) boundary pixels and then compute new bounding boxes on the de-skewed outlines, as FIG. 8B illustrates. FIG. 8B shows the new bounding boxes 84 and 86, which we will refer to as the bounding boxes of the output documents ("BBODs") to distinguish them from the original bounding boxes of the input documents ("BBIDs"). If the BBODs turn out not to overlap, the user does not have to re-orient the documents. The high-resolution image's de-skewing occurs as was just described, with de-skewing values determined for all pixels within a BBID. But if a pixel's transformed location falls outside of a given component's BBOD, it is not used to generate that component's output image.

Figure 9:
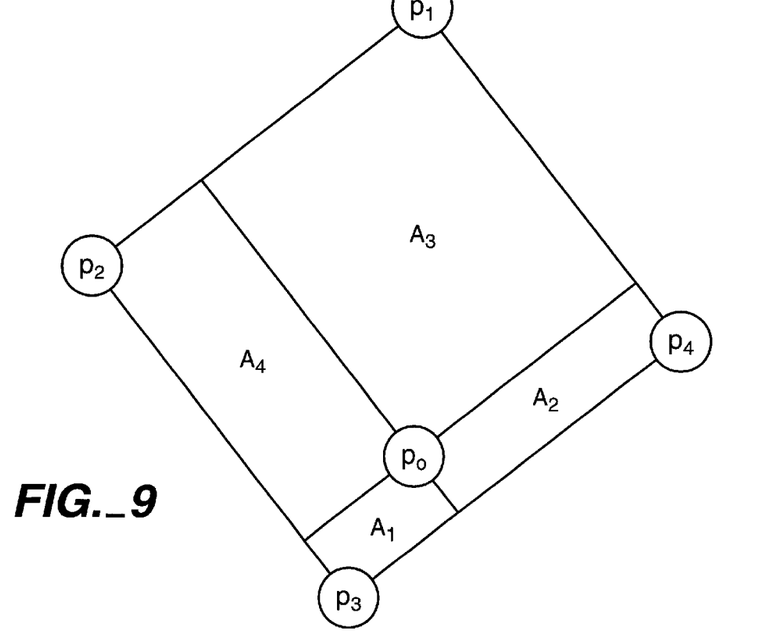
FIG. 9 is a diagram that depicts the bi-linear interpolation employed to assign pixel values after de-skewing.

The BBOD can be used for other purposes. If there is only a single document on the scanner bed, the document size indicated by the BBOD can be used to select a paper size automatically for copying purposes or to suggest that paper size for the user's approval. The output-pixel location typically corresponds to inter-pixel locations in the input image. To determine the value of an output pixel centered at a point corresponding to FIG. 9's input-image point $p_0$ the image processor begins with the gray-scale values, computed as in equation (1), of the four closest input pixels, whose centers FIG. 9 depicts as being at points $p_1$, $p_2$, $p_3$, and $p_4$. A gray-scale value for $p_0$ is determined in accordance with the following equation:

$$I(p_0) = \frac{\sum_{i=1}^{4} A_i I(p_i)}{\sum_{i=1}^{4} A_i}, \quad (14)$$

where the $A_i$'s are the areas depicted in FIG. 9.

The RGB value for $p_o$ is then computed as deviations from this interpolated gray value in accordance with:

$$R(p_o) = I(p_o) + \Delta R_n$$

$$G(p_o) = I(p_o) + \Delta G_n,$$

$$B(p_o) = I(p_o) + \Delta B_n \quad (15)$$

where $n=1, 2, 3,$ or $4$ is the index of the closest input pixel, and:

$$\Delta R_n = R(p_n) - I(p_n) \; \Delta G_n = G(p_n) - I(p_n). \; \Delta B_n = B(p_n) - I(p_n) \quad (16)$$

The output pixel receives the value thus imputed to the corresponding input-image point $p_o$.

Figure 10A:
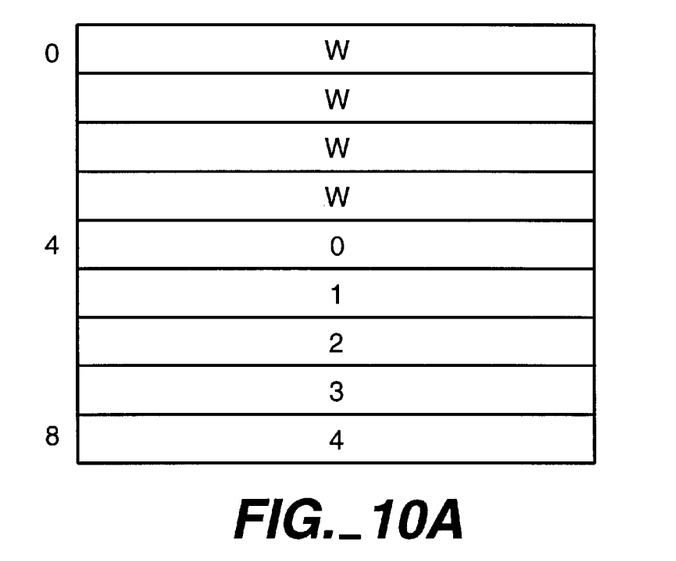
FIGS. 10A and 10B are diagrams of an image buffer used in the illustrated embodiment of the present invention.
Figure 10B:
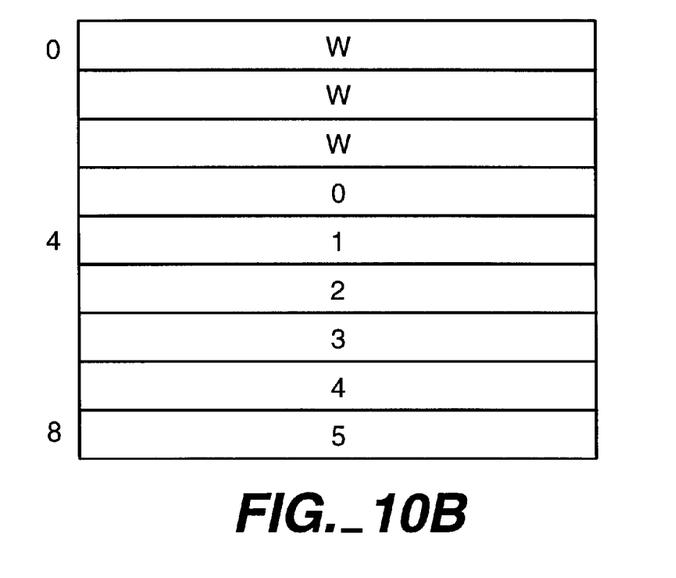

It is apparent from the foregoing discussion that determining the value for a pixel at one location in the output image can require input-pixel data drawn from anywhere in the input image. But it may be burdensome to buffer the entire input image in order to compute output-image values. For high-resolution images, such as a 240 dpi image on a A4-size document, the buffer size required to contain the entire image is around 20 megabytes. But the value-computation operation can actually be performed with a considerably smaller buffer if we make the assumption that the skew angle is quite small. This assumption is reasonable, since the user will usually place the constituent documents in rough alignment or can be prompted to do so. If the skew angle is assumed to be less than $\theta_M$, then the number of input rows required to determine the values in an output row of width W equals the lowest whole number greater than W|tan $\theta_M$|. Based on this observation, our procedure for calculating the output values employs a buffering scheme that FIGS. 10A and 10B depict.

For the sake of illustration, we will assume that the number of required input lines determined in accordance with the calculation just described comes out to be eight for a particular values of W and $\theta_M$. Our approach employs an odd number of buffer rows, so we employ a buffer with nine rows labeled 0–8, as FIG. 10A illustrates. To determine the values in the top output row, row 0, we fill the buffer as FIG. 10A indicates. Specifically, we put the corresponding input row 0 in the middle buffer row, which is row 4 in this case, with subsequent input rows below it. The buffer rows above it, for which there are no corresponding input rows, are filled with white values, i.e., with values (255, 255, 255) in an 8-bit RGB scheme. The buffer contains all of the input values needed to compute that first output row's values. (Actually, because rows other than the one that includes the constituent image's center of rotation undergo some translation in addition to the rotation, the number of buffer rows may need to be slightly more than the value indicated above if, as we prefer, the buffered input rows are always to be centered on the output row whose values are being computed.) Once row 0's output values are determined, they are sent to the printer or the next processing operation—so that, e.g., scanning and printing can be performed concurrently—and the buffer rows are advanced as FIG. 10B illustrates so that input row 1 is now centered in the buffer. The output row 1 is then computed from these values. This operation continues until the end of the output image is reached.

This completes the task of re-orienting the image's individual constituent documents in accordance with the present invention. Typically, though, this re-orientation operation is but one of a number of processing operations that the image processor performs in order to generate the printer's input. Many of those operations, such as constituent-image-specific white balancing, contrast enhancement, and thresholding, employ parameterized functions that depend on various of a constituent document's global features such as average brightness, brightness variation, average saturation, etc. The data for these parameters is taken most economically from a "preview," low-resolution version of the image such as the one used as described above to identify components and determine their skew angles. That is, the parameter determination should be performed before conversion to the high-resolution de-skewed image. But the parameters should be based on the individual constituent documents rather than on the total image.

Figure 11:
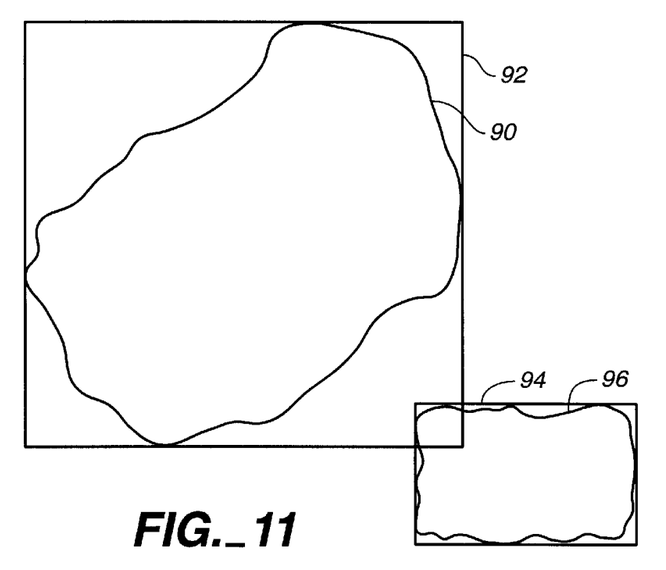
FIG. 11 is a diagram illustrating the problem of overlapping component bounding boxes.

Now, the statistics on which the parameter determinations depend could simply be taken from all (low-resolution) pixels in the BBID. As FIG. 11 shows, though, the resultant data could easily be inaccurate. Component 90's bounding box 92 overlaps the bounding box 94 of another component 96. So taking statistics from all pixels within bounding box 92 would result in parameters based on data taken not only from component 90 but also from component 96.

To avoid thus mixing component data, one could instead retain the component-membership-indicating labels mentioned above. More specifically, one could retain, for each component, each scan row's and each scan column's beginning and end pixel locations. If a pixel in a given row and column is both between a given component's first and last pixels in a given row and between its first and last pixels in a given column, then that pixel's value will contribute to the data taken for that component. But retaining all of those location values for all of the rows and columns of all of the components both through the parameter determination and through the processing on which those parameters depend is inefficient from a memory-usage standpoint.

Figure 12:
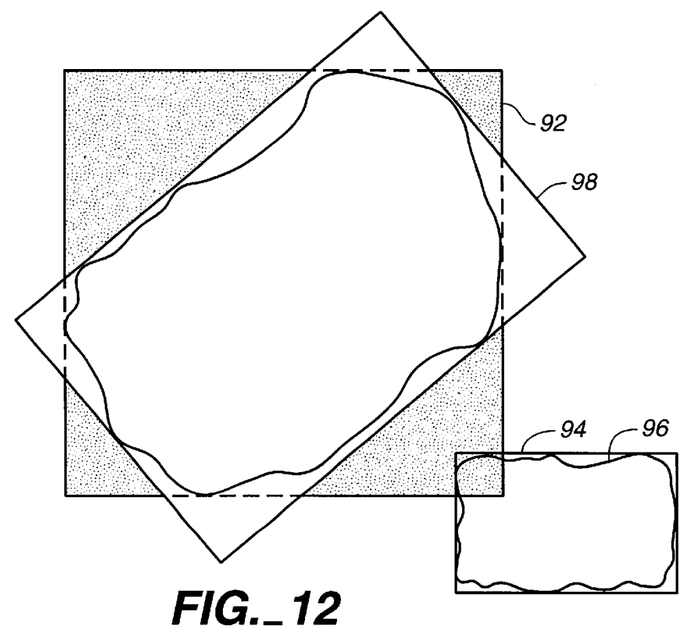
FIG. 12 is a diagram that depicts use of a slanted output-document bounding box to solve the overlapped-bounding-box problem.

We have devised an approach that is much less memory intensive. This approach employs what we refer to as the slanted bounding box of the output document ("SBBOD"), which FIG. 12 depicts. The SBBOD is the rectangle that results from skewing the BBOD by the associated component's skew angle. For a given component, statistics are taken only from pixels that fall within the intersection of the component's SBBOD 98 and its BBID 92. That is, the statistics for a component 90 are taken from those pixels within the BBOD that are not within FIG. 12's shaded regions.

Figure 13:
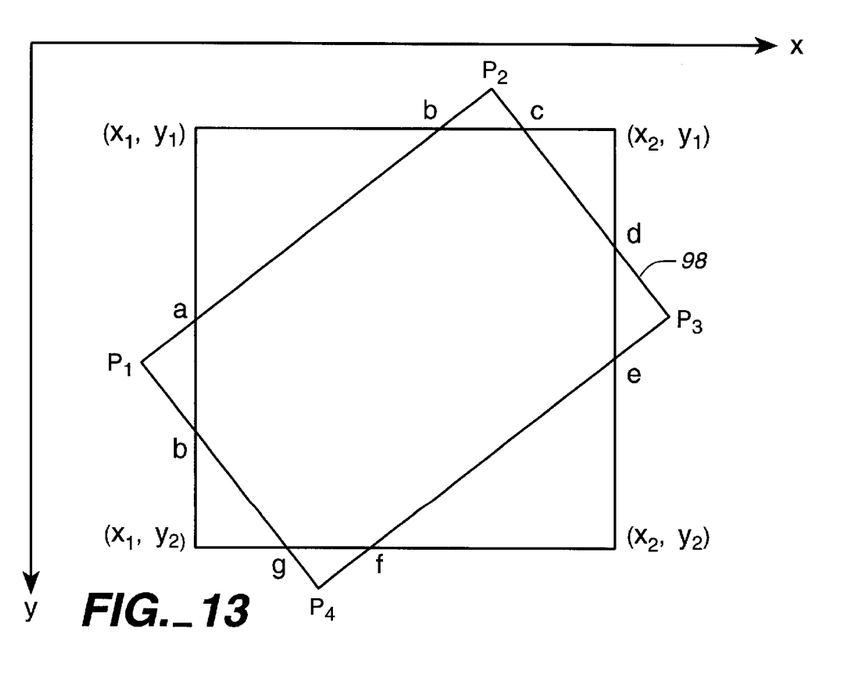
FIG. 13 is a diagram depicting the various geometrical quantities employed for that solution.

More specifically, the linear equations for the SBBOD 98's borderlines depicted in FIG. 13 are given in a simple form such as:

$$y-m_{12}x-b_{12}=0 \tag{17}$$

$$y-m_{23}x-b_{23}=0 \tag{18}$$

$$y-m_{34}x-b_{34}=0 \tag{19}$$

$$y-m_{14}x-b_{14}=0 \tag{20}$$

for border lines $|P_1P_2|$, $|P_2P_3|$, $|P_3P_4|$, and $|P_1P_4|$, respectively. From these equations, intersection point a is determined by substituting $x_1$ into equation (17), intersection points b and c are determined by substituting $y_1$ into equations (17) and (18), respectively, and the other intersection points d, e, f, g, and h are similarly determined.

When statistics thereafter need to be taken from component 90's pixels, each pixel whose y coordinate is less than that of intersection point a and whose x coordinate is less than that of intersection point b has its coordinates substituted into the equation for line $|P_1P_2|$, i.e., equation (17). If the equation evaluates to a negative number, then that pixel does not contribute to component 90's data. Similarly, each remaining pixel whose x coordinate is greater than intersection point c's and whose y coordinate is less than intersection point d's has its coordinates substituted into line $|P_2P_3|$'s equation (18). If the equation evaluates to a negative number, then that pixel does not contribute to component 90's data.

Each remaining pixel whose x coordinate is greater than intersection point f's and whose y coordinate exceeds intersection point e's has its coordinates substituted into line $|P_3P_4|$'s equation (19). If the equation evaluates to a positive number, then that pixel does not contribute to component 90's data. Finally, each remaining pixel whose x coordinate is less than intersection point g's and whose y coordinate exceeds intersection point b's has its coordinates substituted into line $|P_1P_4|$'s equation (20). If the equation evaluates to a positive number, then that pixel does not contribute to component 90's data. Data are taken from every other pixel whose x coordinate is between $x_1$ and $x_2$ and whose y coordinate is between $y_1$, and $y_2$.

The present invention provides a way of easily avoiding the disordered appearance that has heretofore afflicted multiple-document images. It thus constitutes a significant advance in the art.

What is claimed is:

1. For generating a composite output image by separately de-skewing constituent skew regions of a composite input image, a method comprising the steps of:
  A) receiving electrical input signals representing the composite input image;
  B) providing a preview version of the composite input image, which preview version consists of a plurality of preview pixels;
  C) identifying as qualifying pixels the preview pixels that meet a set of at least one predetermined pixel-qualification criterion;
  D) identifying as components connected groups of the qualifying pixels;
  E) identifying as qualifying components the components that meet a set of at least one predetermined component-qualification criterion;
  F) determining a skew region of the composite input image from each qualifying component in accordance with a skew-region procedure;
  G) associating a respective de-skew angle with each skew region, the de-skew angle associated with at least one skew region differing from the se-skew angle associated with at least one other skew region;
  H) producing as the composite output image an image that includes a respective constituent output sub-image generated from each skew region of the composite input image by rotating that skew region by its de-skew angle; and
  I) generating electrical signals that represent the composite output image.

2. A method as defined in claim 1 wherein one said component-qualification criterion is that, for a given component to be a qualifying component, the region of the input composite image defined in accordance with an inner-region procedure from the given component cannot be contained within the region of the input composite image defined in accordance with an outer-region procedure from any other component.

3. A method as defined in claim 2 wherein the inner- and outer-region procedures are the same.

4. A comprising:
  A) a scanner that optically scans an input region and generates electrical scanner signals representing an image of the input region;
  B) image-processing circuitry that performs a sequence of at least one image-revision step, in which sequence each image-revision step receives a respective input-image version consisting of input pixels and produces there-from an output image version consisting of output pixels, the input image version of the first image-revision step is the image represented by the scanner signals, the input image version of any subsequent image-revision step is the output image version of the preceding image-revision step, and one of the image-revision steps is a de-skewing operation whose input image is denominated a composite input image and comprises the steps of:
    i) providing a preview version of the composite input image, which preview version consists of a plurality of preview pixels;
    ii) identifying as qualifying pixels the preview pixels that meet a set of at least one predetermined pixel-qualification criterion;
    iii) identifying as components connected groups of the qualifying pixels;
    iv) identifying as qualifying components the components that meet a set of at least one predetermined component-qualification criterion;
    v) determining a skew region of the composite input image from each qualifying component in accordance with a skew-region procedure;
    vi) associating a respective de-skew angle with each skew region, at least one de-skew angle differing from at least one other de-skew angle;
    vii) producing as the de-skewing operation's output image a composite output image that includes a constituent output sub-image respectively generated from each skew region of the composite input image by rotating that skew region by its de-skew angle; and
    viii) generating electrical signals that represent the composite output image; and
  C) a printer that prints the image that the output image version of the last image-revision step represents.

5. A photocopier as defined in claim 1 wherein one said component-qualification criterion is that, for a given component to be a qualifying component, the region of the input composite image defined in accordance with an inner-region procedure from the given component cannot be contained within the region of the input composite image defined in accordance with an outer-region procedure from any other component.

6. A photocopier as defined in claim 5 wherein the inner- and outer-region procedures are the same.

7. A storage medium containing instructions readable by a computer to configure the computer to function as an apparatus for:
  A) receiving electrical input signals representing a composite input image that includes constituent skew regions;
  B) providing a preview version of the composite input image, which preview version consists of a plurality of preview pixels;
  C) identifying as qualifying pixels the preview pixels that meet a set of at least one predetermined pixel-qualification criterion;
  D) identifying as components connected groups of the qualifying pixels;
  E) identifying as qualifying components the components that meet a set of at least one predetermined component-qualification criterion;
  F) determining a skew region of the composite input image from each qualifying component in accordance with a skew-region procedure;
  G) associating a respective de-skew angle with each skew region, the de-skew angle associated with at least one skew region differing from the se-skew angle associated with at least one other skew region;
  H) producing as the composite output image an image that includes a respective constituent output sub-image generated from each skew region of the composite input image by rotating that skew region by its de-skew angle; and
  I) generating electrical signals that represent the composite output image.

8. A storage medium as defined in claim 7 wherein one said component-qualification criterion is that, for a given component to be a qualifying component, the region of the input composite image defined in accordance with an inner-region procedure from the given component cannot be contained within the region of the input composite image defined in accordance with an outer-region procedure from any other component.

9. A storage medium as defined in claim 8 wherein the inner- and outer-region procedures are the same.

* * * * *

UNITED STATES PATENT AND TRADEMARK OFFICE
CERTIFICATE OF CORRECTION

PATENT NO.    : 6,373,590 B1
DATED         : April 16, 2002
INVENTOR(S)   : Hakan Ancin et al.

It is certified that error appears in the above-identified patent and that said Letters Patent is hereby corrected as shown below:

<u>Column 13,</u>
Line 47, insert -- photocopier -- before "comprising".

Signed and Sealed this

Fifth Day of November, 2002

Attest:

JAMES E. ROGAN
Attesting Officer    *Director of the United States Patent and Trademark Office*